(No Model.)

J. D. H. CLEAVLAND.
PULLEY.

No. 307,631. Patented Nov. 4, 1884.

WITNESSES:
C. Neveux
C. Sedgwick

INVENTOR:
J. D. H. Cleavland
BY Munn & Co
ATTORNEYS.

UNITED STATES PATENT OFFICE.

JOHN D. H. CLEAVLAND, OF SMITHFIELD, MINNESOTA.

PULLEY.

SPECIFICATION forming part of Letters Patent No. 307,631, dated November 4, 1884.

Application filed April 12, 1884. (No model.)

*To all whom it may concern:*

Be it known that I, JOHN DOUGLASS H. CLEAVLAND, of Smithfield, in the county of Wabasha and State of Minnesota, have invented certain new and useful Improvements in Pulleys, of which the following is a full, clear, and exact description.

This invention relates to metal pulleys which are designed to be clothed with leather or other similar material on their peripheries. It will be found very useful applied to pulleys for thrashing and other like machines, but is not restricted thereto.

It consists in constructing the pulley with dovetail or locking recesses in or across its peripheral portion, in which are inserted wooden keys to facilitate the securing of the leather on or around the pulley by nailing it to the keys. This mode of fastening the leather or clothing will be found much more convenient, and may be much more quickly done than securing it by rivets, as ordinarily done.

Reference is to be had to the accompanying drawings, forming part of this specification, in which similar letters of reference indicate corresponding parts in both the figures.

Figure 1:
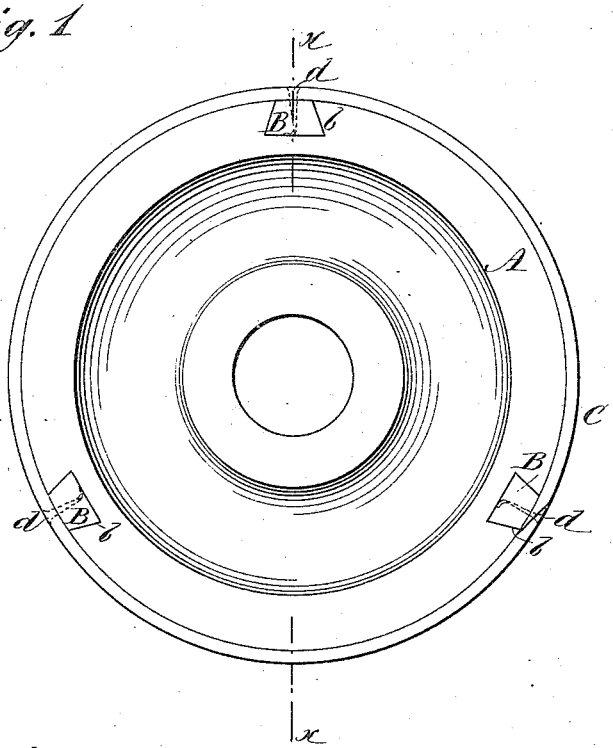
Figure 2:
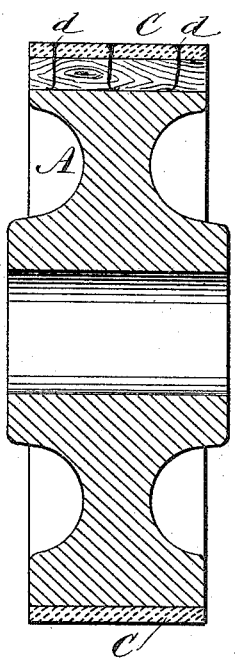

Figure 1 represents a side view of a pulley embodying my invention, and Fig. 2 a transverse section of the same on the line $x\ x$ in Fig. 1.

A indicates a cast-metal pulley, which may either be a solid or open one, and of any desired pattern, with or without a projecting rim. In the peripheral portion of the pulley are cast or otherwise formed any number of cross dovetail or locking recesses, $b$, in which are fitted or driven wooden keys B, that correspond on their outer faces to the exterior peripheral shape of the pulley. A pulley thus constructed readily admits of the leather or other flexible clothing, C, being secured on the pulley by simply driving clout or other nails, $d$, through it into the wooden keys B, said nails, if of the right length, clinching when driven home. The number and size of the dovetail recesses and wooden keys fitting therein will be governed, to a large extent, by the size of the pulley.

Having thus described my invention, what I claim as new, and desire to secure by Letters Patent, is—

1. A cast-metal pulley constructed with dovetail or locking recesses in or across its rim or outer peripheral portion, and provided with wooden keys arranged to fit within said recesses to facilitate the securing of leather or clothing on the pulley, substantially as specified.

2. A pulley having its rim or body of metal constructed with dovetail or locking recesses in or across its periphery, wooden keys inserted in said recesses, and the whole covered by leather or clothing secured by nails to the keys, essentially as shown and described.

JOHN D. H. CLEAVLAND.

Witnesses:
WILLIAM REIFKOGEL,
JOHN F. POPE.